(12) United States Patent
Grieder et al.

(10) Patent No.: US 8,214,263 B2
(45) Date of Patent: Jul. 3, 2012

(54) COMMUNITY MANAGEMENT FOR ELECTRONIC BUSINESS TO BUSINESS TRANSACTIONS

(75) Inventors: Bruno Grieder, Paris (FR); Jean-Pierre Foehn, Avon (FR); Emmanuel Thiriez, Le Chesnay (FR)

(73) Assignee: Amalto Technologies Corp., San Mateo, CA (US)

( * ) Notice: Subject to any disclaimer, the term of this patent is extended or adjusted under 35 U.S.C. 154(b) by 614 days.

(21) Appl. No.: 12/328,935

(22) Filed: Dec. 5, 2008

(65) Prior Publication Data

US 2010/0146047 A1    Jun. 10, 2010

(51) Int. Cl.
G06Q 30/00    (2012.01)
(52) U.S. Cl. .................................................. 705/26.41
(58) Field of Classification Search ................. 705/26.1, 705/26.4, 26.8, 26.41
See application file for complete search history.

(56) References Cited

U.S. PATENT DOCUMENTS

| | | | | |
|---|---|---|---|---|
| 7,146,331 B1* | 12/2006 | Young | | 705/26.3 |
| 7,430,523 B1* | 9/2008 | Khalidi | | 705/26.4 |
| 7,698,230 B1* | 4/2010 | Brown et al. | | 705/75 |
| 7,970,662 B2* | 6/2011 | Calonge | | 705/26.4 |
| 2003/0036992 A1* | 2/2003 | Preist et al. | | 705/37 |
| 2003/0191812 A1* | 10/2003 | Agarwalla et al. | | 709/217 |
| 2004/0210838 A1* | 10/2004 | Wason | | 715/515 |
| 2005/0125277 A1* | 6/2005 | Estrada et al. | | 705/9 |
| 2006/0112002 A1* | 5/2006 | Holland et al. | | 705/37 |
| 2006/0259342 A1* | 11/2006 | Hartenstein et al. | | 705/9 |
| 2007/0130000 A1* | 6/2007 | Assanassios | | 705/14 |
| 2008/0103816 A1* | 5/2008 | Kaplan et al. | | 705/2 |
| 2009/0063639 A1* | 3/2009 | Lingafelt et al. | | 709/206 |

OTHER PUBLICATIONS

Deckmyn, Dominique, "Novell Unveils Products in E-Commerce Push," Computerworld, Framingham, Feb. 14, 2000, vol. 34, iss. 7, p. 6.*
U.S. Appl. No. 13/247,622, Non-final Office Action dated Feb. 24, 2012, 31 pgs.
U.S. Appl. No. 13/247,626, Non-final Office Action dated Mar. 8, 2012, 21 pgs.

* cited by examiner

*Primary Examiner* — Amee A Shah
(74) *Attorney, Agent, or Firm* — Holland & Hart LLP

(57) ABSTRACT

Systems, methods, and devices for the automated, community-based exchange of procurement documents. In some embodiments, there may be different sets of rules for each of a number of different communities of trading partners. Each set of rules may be made up of rules data for the automated exchange of procurement documents in respective communities. By way of example, a host trading partner may select the rules for exchange of procurement documents for a community. Invited trading partners may register for the community, and rules for the community may then be distributed to the registered trading partners.

21 Claims, 9 Drawing Sheets

COMMUNITY MANAGEMENT FOR ELECTRONIC BUSINESS TO BUSINESS TRANSACTIONS

CROSS-REFERENCES

This Application is related to the following U.S. Provisional Patent Applications, the entire disclosures of which are hereby incorporated by reference for all purposes: U.S. application Ser. No. 61/120,231, filed on a date even herewith by Grieder et al., entitled "SECURITY AND CERTIFICATE MANAGEMENT FOR ELECTRONIC BUSINESS TO BUSINESS TRANSACTIONS; and"; U.S. application Ser. No. 61/120,247, filed on a date even herewith by Grieder, et al., entitled "DISTRIBUTED DOCUMENT TRANSFORMATION FOR ELECTRONIC BUSINESS TO BUSINESS TRANSACTIONS".

BACKGROUND

The present invention is generally related to business to business (B2B) document exchange and, more specifically, to the automated and secure exchange of electronic business documents.

Traditionally, the automated exchange of electronic procurement documents has been limited to large corporations. Complex, centralized software products and related support are used to handle transformations and connect the corporation with each of its trading partners. This may involve difficult network and firewall settings, and complex protocols.

By way of example, some of these behind the firewall solutions involve 1) choosing and purchasing a software solution, 2) selecting an integrator for setting up the solution, 3) investing in internal competencies training for maintenance and monitoring purposes (or contracting someone to do so), and 4) going through a new project for each new trading partner or business document flow to be implemented.

Some of these issues have been addressed using various SaaS (Software as a Service) solutions, but there are a number of issues remaining related to the centralized nature of such document exchanges, and the limited flexibility of such a model. Therefore, there may be a need in the art for a standardized solution for procurement document exchange with approved trading partners within trading communities.

SUMMARY

Methods, systems, and devices are described for community-based exchange of procurement documents. In one set of embodiments, a server computer system manages different sets of rules for each of a number of different communities of trading partners. Each set of rules may be made up of rules data for the exchange of procurement documents in respective communities, and specify trading partners invited to join each community. These sets of rules may be stored in one or more data stores local to or remote from the server computer system.

Each trading partner of each community may communicate with the server computer system via a computing device. Once an invited trading partner has registered for a community via the server computer system, the system may distribute the rules and specific features of the community to the registered trading partner. The trading partners of a given community may then exchange procurement documents within the community according to the received set of rules, and other features enabled by community-specific plug-ins.

For each community, there may be one or more host trading partners in communication with the server computer system to select or modify the rules. These rules may include the subscription process for the community, visibility rules within the community, allowed documents types, transformation rules, and software plug-ins to be distributed to trading partners.

In one embodiment, the server computer system includes a rule selection unit, a subscription unit, and a rules distribution unit. The rule selection unit may receive selection data identifying rules for exchange of procurement documents for particular communities from the host trading partners, and store the selections in the data store. The subscription unit may register trading partners to the respective community according to rules data for each community. The rules distribution unit may distribute portions of the rules data to the registered trading partners of each community.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

Figure 1:
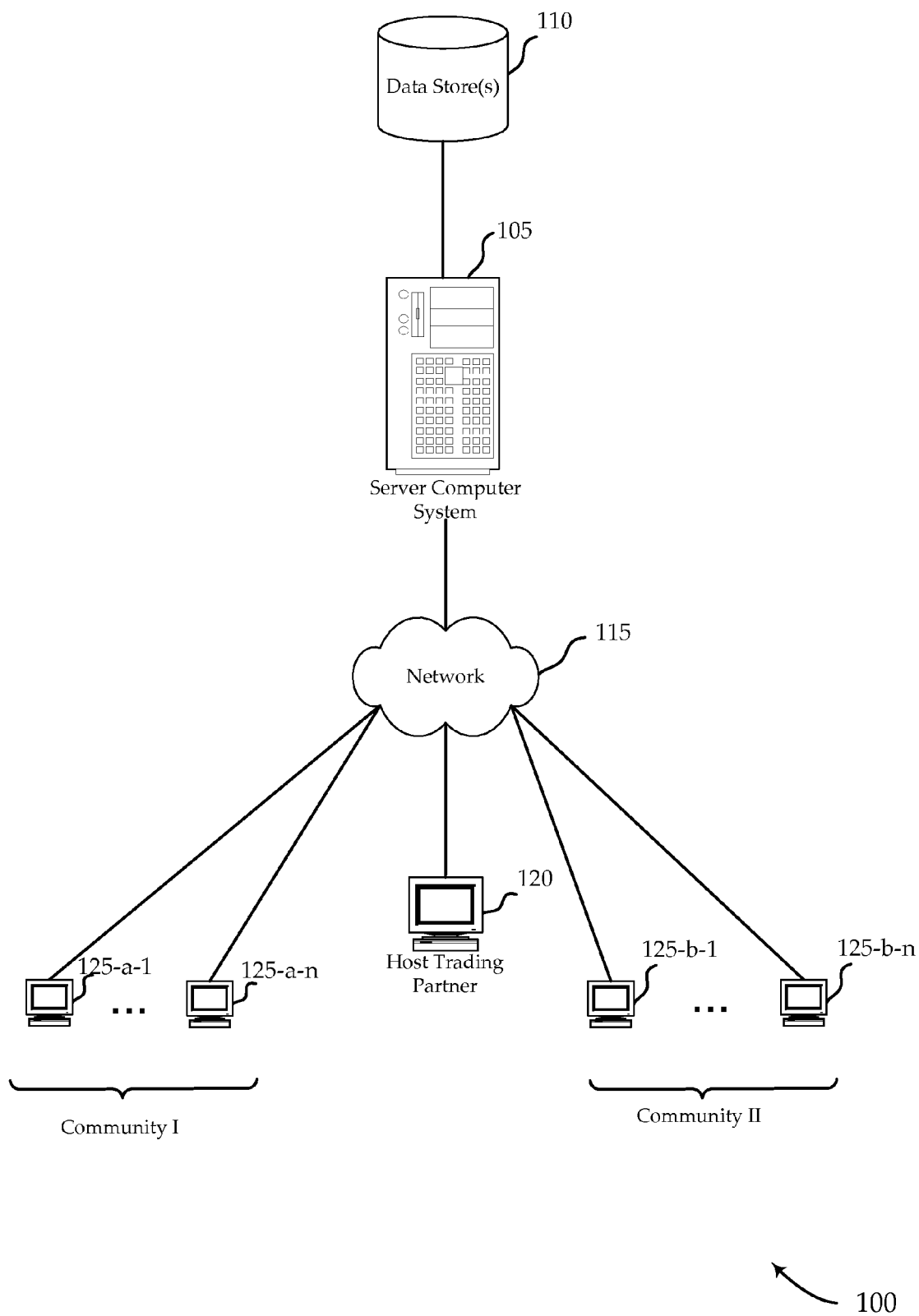
FIG. 1 is a block diagram illustrating a community-based system for procurement document exchange configured according to various embodiments of the invention.

Systems, methods, devices, and software are described for the automated, community-based exchange of procurement documents. In some embodiments, there may be different sets of rules for each of a number of different communities of trading partners. Each set of rules may be made up of rules for the automated exchange of procurement documents in respective communities. By way of example, a host trading partner may select the rules for exchange of procurement documents for a community. Invited trading partners may register for the respective community, and rules for the community may be distributed to the registered trading partners of the community.

This description provides example embodiments only, and is not intended to limit the scope, applicability, or configuration of the invention. Rather, the ensuing description of the embodiments will provide those skilled in the art with an enabling description for implementing embodiments of the invention. Various changes may be made in the function and arrangement of elements without departing from the spirit and scope of the invention.

Thus, various embodiments may omit, substitute, or add various procedures or components as appropriate. For instance, it should be appreciated that in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner.

It should also be appreciated that the following systems, methods, and software may individually or collectively be components of a larger system, wherein other procedures may take precedence over or otherwise modify their application. Also, a number of steps may be required before, after, or concurrently with the following embodiments.

Systems, devices, methods, and software are described for the automated, community-based exchange of procurement documents. In one set of embodiments, shown in FIG. 1, the system 100 includes a server computer system 105. The server computer system 105 is in communication with data store 110, one (or more) host trading partners 120, and two (or more) communities of trading partners 125-a, 125-b. The host trading partners 120 and peer trading partners 125 may each communicate with the server computer system 105 via respective computing devices. The components of the system 100 may be directly connected, or may be connected via a network 115.

The server computer system 105 may include, for example, one or more server computers, workstations, web servers, or other suitable computing devices. The server computer system 105 may be fully located within a single facility or distributed geographically, in which case a network 115 may be used to integrate different components. The server computer system 105 may be configured to communicate with the data store 110. The server computer system 105 may manage different sets of rules for each of the communities of trading partners 125. For the set of rules for each community, rules may be included for the exchange of procurement documents within the community, and may specify trading partners invited to join the community. These sets of rules may be stored in the data store 110 by the server computer system 105, and then manipulated or accessed therein by the server computer system 105. As trading partners 125 join a community, all, or part, of the set of rules may be distributed to the by the server computer system 105 to the trading partners 125.

A community of trading partners (e.g., Community I 125-a) may be created when a host trading partner 120 selects a set of rules for the community. A single host trading partner 120 may create one (or more) different communities, and subsequently modify the rules therein; for other communities, multiple host trading partners 120 may have the joint ability to create or modify rules for the community. Regardless of the particular configuration, a host trading partner 120 may transmit selection data to the server computer system 105, the selection data identifying rules for exchange of procurement documents for a particular community of trading partners 125-a. The selection data may specify the subscription process, the visibility rules within the community, the allowed documents types, the transformation rules, and the trading partners invited to join the community. The host trading partner 120 may be a trading partner 125 in the community, or not. In other embodiments, the rules for a community of trading partners need not be selected by a host 120 (e.g., the rules may be selected by, or standard rules of, the server computer system 105, and there need not be a host).

As noted above, the server computer system 105 may receive the selection data, and generate rules for the community based on the selection data. These generated rules may be stored as rules data in the data store 110 by the system 105. The system 105 may generate and transmit advertisements to those trading partners 125 who are invited to join the community (as specified in the rules data).

For each community, the server computer system 105 may register trading partners responding to the advertisements. The registration may occur according to the set of rules data applicable to the community. For example, the registration may occur with the subscription form and related process (e.g., automated, requiring a validation, or requiring a payment) specified in the rules data for the community. The registered trading partners 125 for each community may be stored in the data store 110 by the server computer system 105. Based on visibility rules for each community, the server 105 may identify and distribute address information for each of the registered trading partners 125 to the remaining trading partners 125 of the applicable community. For example, in some communities, all trading partners 125 may be visible to each other, while in others, they are each visible only to the host trading partner 120.

Once a trading partner 125 is registered, the server computer system 105 may distribute all or part of the rules data for the community to the trading partner 125. The distributed rules data may include one or more plug-in modules (e.g., with various user interface, security, or transformation capabilities), specify the allowed documents that may be used, specify other transformation rules or specifications for the community, and identify validation rules, as well.

The registered trading partners 125 of the community may then exchange procurement documents directly (peer to peer), according to the distributed rules. In some communities, the procurement document exchange may occur only between a host trading partner 120 and other trading partners 125 of the community; in other communities, the document exchange may occur between peers, as well. There may be any number of hybrid systems, as well, wherein document exchange may occur between only a subset of the peers. This document exchange, within a community, may be only available to the members of the community. Moreover, while in some embodiments the document exchange may be performed directly peer to peer, and not be conducted through the server computer system 105, in other embodiments the exchange may occur via the server computer system 105.

The components of the system 100 may be directly connected, or may be connected via a network 115, which may be any combination of the following: the Internet, an IP network, an intranet, a wide-area network ("WAN"), a local-area network ("LAN"), a virtual private network, the Public Switched Telephone Network ("PSTN"), or any other type of network supporting data communication between devices described herein, in different embodiments. A network 115 may include both wired and wireless connections, including optical links. Many other examples are possible and apparent to those skilled in the art in light of this disclosure. In the discussion herein, a network 115 may or may not be noted specifically. If no specific means of connection is noted, it may be assumed that the link, communication, or other connection between devices may be via a network 115.

As the term is used herein, "procurement documents" may include procurement documents, a request for information, a request for price, a request for quotation, a quote, purchase order, a sales order, a change order, an order cancellation, an order confirmation response, an order response, an order status request, an order status response, an advance shipment notification, a dispatch advice, a goods receipt, a receipt advice, a planning schedule, a shipping schedule, a supply schedule, a supply schedule response, a delivery planning, a delivery planning response, a delivery planning proposal, an invoice, an invoice response, a freight invoice, a self billed credit note, a self billed invoice, a credit note, a debit note, a remittance advice, a payment request, a payment status request, a payment status response, an inventory report, a consumption forecast, a consumption report, a bill of lading, a transportation status, a waybill, forwarding instructions, a catalog, a catalog deletion, a catalog item specification update, a catalog pricing update, or catalog request.

Figure 2:
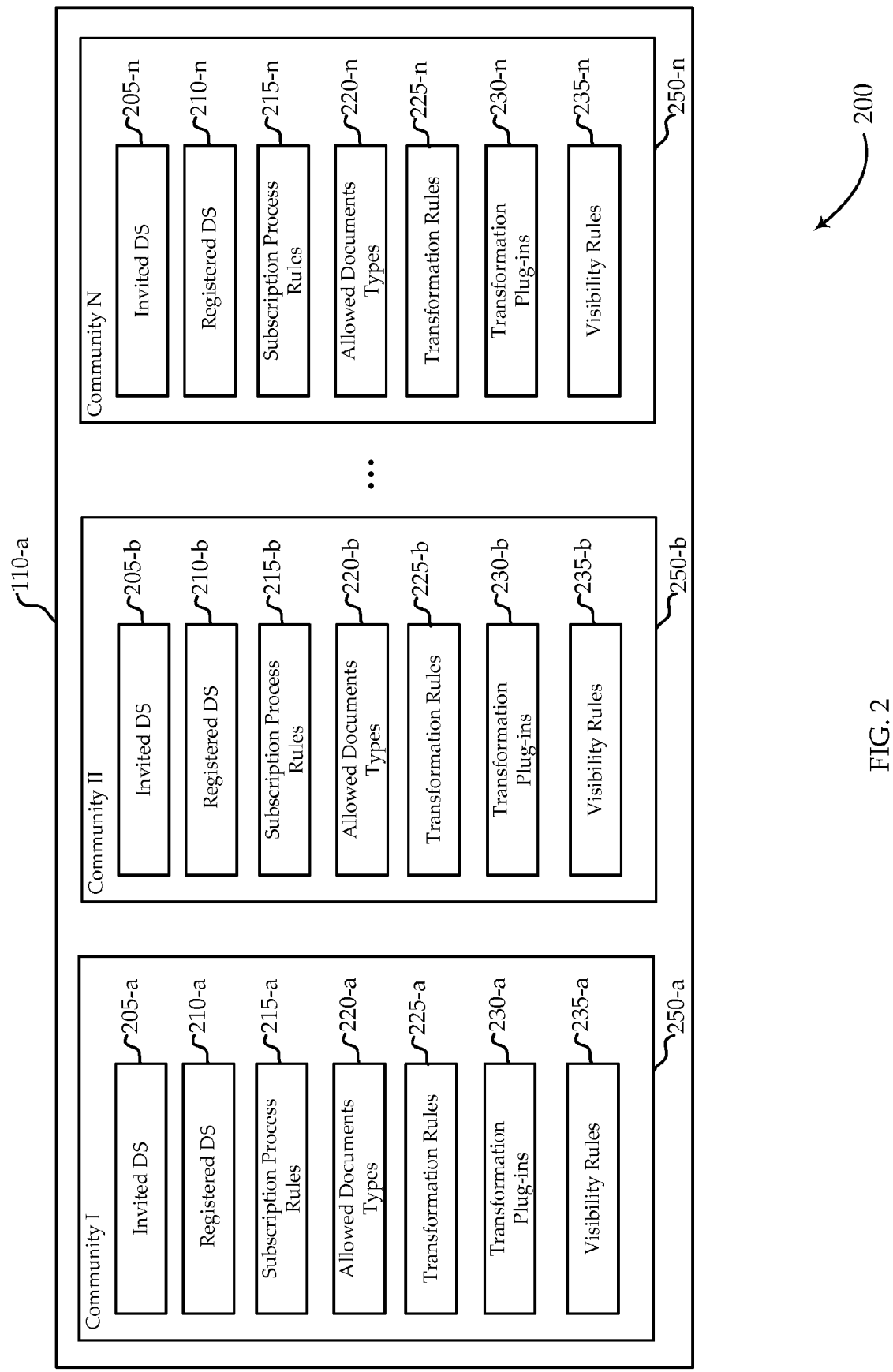
FIG. 2 is a block diagram illustrating a data store for storing community-based procurement document exchange information according to various embodiments of the invention.

Turning to FIG. 2, a block diagram 200 illustrates an example format for a data store 110-a configured to store rules data for each of a number of trading communities according to some embodiments of the invention. This may be the data store 110 of FIG. 1, or may be used in other systems or on other devices. The data store 110 may be a single database, while in other embodiments, it may be made up of any number of separate and distinct databases. The data store 110 may include one, or more, relational databases or components of relational databases (e.g., tables), object databases, or components of object databases, spreadsheets, text files, internal software lists, or any other type of data structure suitable for storing data. Thus, it should be appreciated that a data store 110 may each be multiple data storages (of the same or different type), or may share a common data storage with other data stores. Although in some embodiments the data store 110 may be distinct from a server computer system 105, in other embodiments it may be integrated therein to varying degrees.

Within the data store, rules data 250 is stored for each of n communities of trading partners (e.g., the trading partners 120, 125 of FIG. 1). Thus, the depicted data store 110-a includes distinct rules data for community I 250-a, community II 250-b, and so on up to community n 250-n. By way of example, refer first to the rules data of community I 250-a, which includes data on the trading partners invited to join community I 205-a, data on the trading partners registered in community I 210-a, the subscription process rules (forms and process) specific to community I 215-a, the allowed document types for community I 220-a, the transformation rules for community I 225-a, the transformation plug-ins 230-a for the trading partners of community I, and the visibility rules 235-a for the trading partners of community I. For each community, similar types of rules data (rules data 250-b ... 250-n) may be stored, although the rules for each community may be different.

Figure 3:
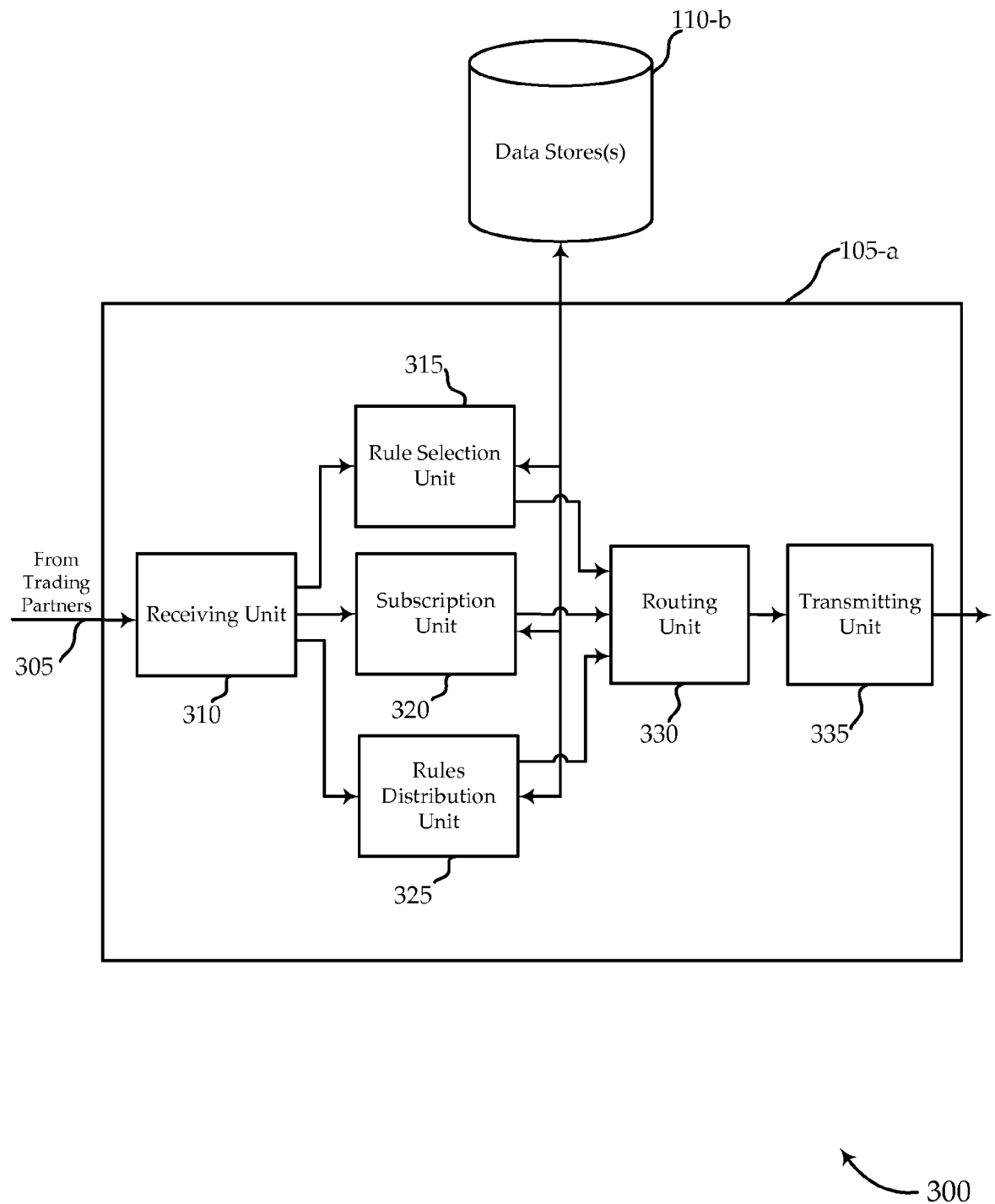
FIG. 3 is a block diagram illustrating a server computer system for community-based procurement document exchange according to various embodiments of the invention.

Turning next to FIG. 3, a block diagram 300 is shown illustrating a server computer system 105-a for community-based procurement document exchange according to various embodiments of the invention. This may be the server computer system 105 of FIG. 1, although this server computer system 105-a configuration may be used in a variety of alternative systems, as well. The depicted server computer system 105 includes a receiving unit 310, rule selection unit 315, subscription unit 320, rules distribution unit 325, routing unit 330, and transmitting unit 335, which may be integrated into one device or distributed locally or remotely. Also shown is a data store 110-b, which may be the data store 110 of FIG. 1 or 2.

To begin discussion of the server computer system 105-b, first consider that a communication signal 305 may be received from a trading partner (e.g., trading partners 125 of FIG. 1) by a receiving unit 310. The receiving unit 310 may, for example, demodulate and decode received communication signals and identify the types of data being received. If the receiving unit 310 identifies a received set of data as selection data from a host trading partner (e.g., host trading partner 120 of FIG. 1), the receiving unit may direct the rule selection data to the rule selection unit 315.

The rule selection unit 315 may receive selection data identifying rules for the exchange of procurement documents for a first community of trading partners, including information identifying those trading partners invited or otherwise eligible to join the community. This selection data may be received in response to a transmission from the rule selection unit 315 (e.g., wherein the rule selection unit 315 made a previous transmission which included user interface data allowing a host trading partner to set up or modify rules for a particular community).

As noted above, the rule selection unit 315 may receive selection data for a particular community identifying rules for the subscription process (forms and process) specific to the community, the allowed document types for the community, the transformation rules for the community, the visibility rules (who in the community can see each other and, perhaps, trade with each other), validation rules, and document display information. The received selection data may indicate a change in rules and in those invited to join the community. The selection data may be received from host trading partner 120 with rights to create or control particular communities; such rules may be different for each community.

The rule selection unit 315 may use the received selection data (or a series of sets of selection data) to automatically generate a set of rules data made up of rules for the exchange of procurement documents in a given community, and specifying trading partners invited to join the community. The generated rules data may be stored by the rules selection unit 315 in the data store 110-b. Therefore, using the selection data, the rule selection unit 315 may generate rules data specifying the subscription process for a community (e.g., the process by which trading partners 125 are registered to a community, specifying the forms to be used, the process for registration, security issues and certificate exchange for registration, costs or other registration fees, etc.).

The rule selection unit 315 may use the received selection data (or a series of sets of selection data) to generate rules data including a listing of the document types allowed to be exchanged for a community. A document type may be one or more types of extensible markup language (XML) documents, Petroleum Industry Data Exchange (PIDX) documents (e.g., PIDX-RNIF or PDIX AS2), Chemical Industry Data Exchange (CIDX) documents, commerce eXtensible Markup Language (cXML) documents, XML Common Business Library (xCBL) documents, Universal Business Language (UBL) documents, Electronic Business using eXtensible Markup Language (ebXML) documents, XML Book Industry Transmission Standards (XBITS) documents, Excel or other spreadsheet documents, portable document format (PDF) documents, any combination, and any other formatted document types. In one embodiment, community-specific document transformation rules may identify standardized document formats for direct exchange of procurement documents between trading partners of the community. In other embodiments, the allowed document specification may specify the document format that may be used before transformation, after transformation, or before, during, or after transmission. Thus, the generated rules data may specify the types of allowed documents that may be input into a downloaded plug-in for transformation, the types that may be transmitted, or the types that may be received.

The rule selection unit 315 may use the received selection data (or a series of sets of selection data) to generate plug-ins (then stored in data store 110-*b*) to be downloaded by trading partners after they subscribe to a community. The plug-ins may be automatically downloaded upon registration, distributed to be installed on trading partner computing devices to transform one or more of the first set of allowed document types into a standardized document format for transmission. The plug-ins may include all, or any part, of the rules data. Thus, the rules data may be integrated into a plug-in varying degrees, or may be distributed separately. Each plug-in may be community specific. By way of example, a plug-in (generated by the rules selection unit 315, or otherwise) may perform transformations, specify allowed document types or specific rules, and be configured to generate specific user interface features (e.g., specific screens for creating a new message or displaying a message, either sent or received).

The rule selection unit 315 may use the received selection data (or a series of sets of selection data) to generate rules data including visibility rules identifying who in the community can see each other and, perhaps, trade with each other). By way of example, in some embodiments, visibility rules may specify that each trading partner may see each other (e.g., via respective computing devices used for procurement document exchange), while others may specify that they can only see or exchange procurements documents with the host or a select number of trading partners. Rules data may prevent processing of non-conforming documents (on a per community basis), and rules data may specify style sheets for displaying documents or forms for creating documents.

Once the rules data been generated by the rules selection unit 315, the subscription unit 320 may access the data store 110-*b* to identify those trading partners invited to join the community. Some communities may be open communities, specifying all trading partners are invited to join, while others may be closed communities, specifying limited trading partners are invited to join the second community. The subscription unit 320 may (via routing unit 330 and transmitting unit 335), distribute advertisements for the community to the trading partners invited to join the community. Based on the response, the subscription unit 320 may register trading partners to the first community according to a community-specific set of rules data identifying the subscription process (an example of this process is set forth in FIG. 7). Thus, the subscription unit 320 may securely exchange documents with invited trading partners to register them for the community; once the registration process is complete, these trading partners are subscribed to the community. A listing of the subscribed trading partners may be generated and stored by the subscription unit 320 at the data store 110-*b*.

Once the trading partner registration is performed by the subscription unit 320, the rules distribution unit 325 may access the data store 110-*b* to identify those trading partners registered to the community. The rules distribution unit 325 may be configured to distribute some or all of the set of rules data (via the routing unit 330 and transmitting unit 335) to the subscribed trading partners of a given community. In one embodiment, the rules distribution unit 325 may distribute to each trading partner of a community identification data identifying the other trading partners of the community, in accordance with visibility rules for the community. In another embodiment, the rules distribution unit 325 may distribute to each trading partner of a community rules data including document transformation rules, allowed document types, or a plug-in. In still other embodiments, community-specific business rules, validation rules, and display specification may be distributed, as well. The trading partners of a given community may then exchange procurement documents within the community according to a received set or sets of community-specific rules. As noted, in some embodiments, this document exchange is directly peer-to-peer, secure (digitally encrypted and signed), with approved trading partners of a community (e.g., only between a subset of community members).

The receiving unit 310, rule selection unit 315, subscription unit 320, rules distribution unit 325, routing unit 330, and transmitting unit 335 of the server computer system 105 may, individually or collectively, be implemented with one or more devices using one or more Application Specific Integrated Circuits (ASICs) adapted to perform some or all of the applicable functions in hardware. Alternatively, the functions may be performed by one or more other processing units (or cores), on one or more integrated circuits. In other embodiments, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

Figure 4A:
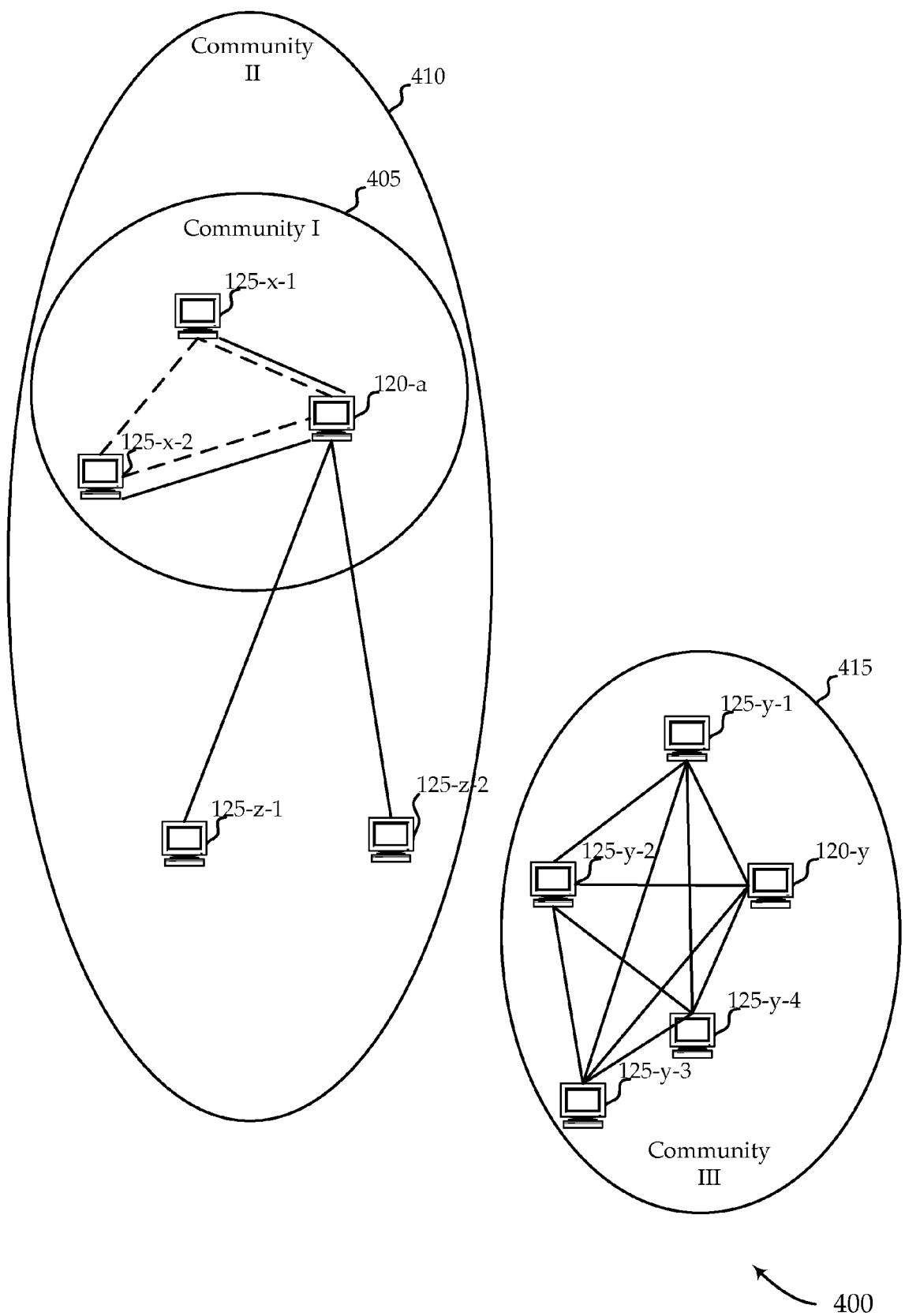
FIG. 4A is a block diagram illustrating communities of a system for community-based procurement document exchange according to various embodiments of the invention.

Referring next to FIG. 4A, a number of communities of trading partners are illustrated in the block diagram 400, according to various embodiments of the invention. In a first community (Community I 405), there is a host trading partner 120-*a*, and two additional trading partners 125-*x*. In Community I 405, the host trading partner 120-*a* may select the rules (e.g., visibility rules, document transformation rules, allowed document types, or plug-in distribution rules) for the exchange of procurement documents between the trading partners of Community I. The exchange and visibility rules for Community I 405 dictate that the trading partners 125-*x* may see and exchange procurement documents with each other, as well as with the host trading partner 120-*a*, according to the rules of Community I 405 (as indicated by the dashed lines of connection).

In a second community (Community II 410), there is the same host trading partner 120-*a*, and the same and additional trading partners 125-*x*, 125-*z*. In Community II 410, the host trading partner may select the rules for the exchange of procurement documents between the trading partners of Community II 410. The exchange and visibility rules for Community II 405 dictate that the trading partners 125-*x*, 125-*z* may see and exchange procurement documents with only the host trading partner 120-*a* according to the rules of Community II 410 (as indicated by the solid lines). Note that trading partner 125-*x*-1 and trading partner 125-*x*-2 may exchange documents with each other according to the rules of Community I 405, but not Community II 410.

In a third community (Community III 415), there is a host trading partner 120-*y* (different from host trading partner 120-*a*), and a number of additional trading partners 125-*y*

(different from trading partners 125-x or 125-z). In Community III 415, the host trading partner 120-y may select the rules (e.g., visibility rules, document transformation rules, allowed document types, or plug-in distribution rules) for the exchange of procurement documents between the trading partners of Community III 415. The exchange and visibility rules for Community III 415 dictate that the trading partners 125-y may see and exchange procurement documents with each other, as well as with the host trading partner 120-b, according to the rules of Community III 415 (as indicated by the solid lines of connection). The rules data for Community I 405 and Community III 415 may be different in one or more ways (e.g., different invited trading partners, subscription rules and procedures, visibility rules, document transformation rules, allowed document types, or plug-in distribution rules).

Figure 4B:
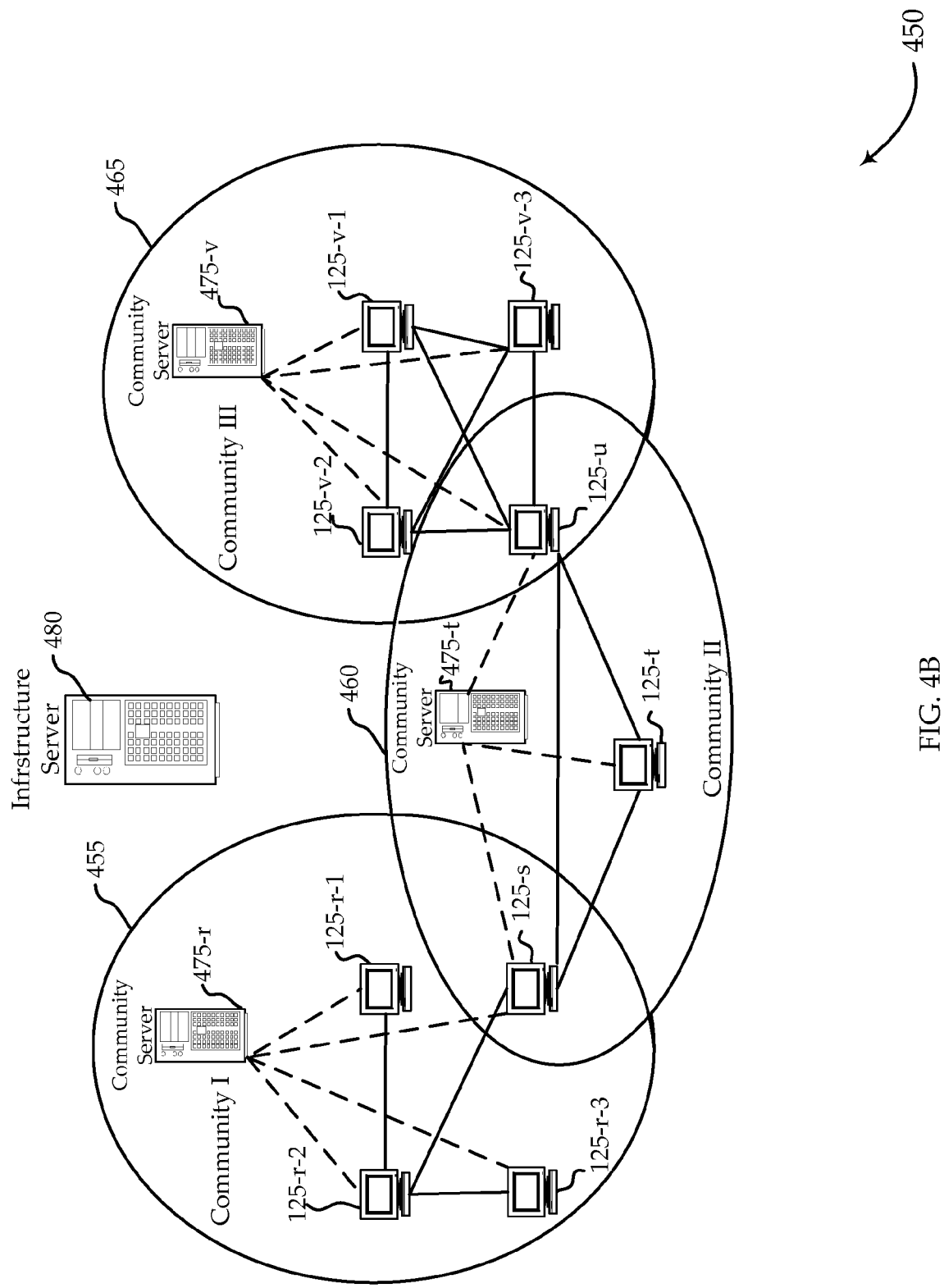
FIG. 4B is a block diagram illustrating community servers of a server computer system in a system for community-based procurement document exchange according to various embodiments of the invention.

Referring next to FIG. 4B, a number of communities of trading partners are illustrated in the block diagram 450, according to some embodiments of the invention. In the illustrated embodiment, there is a separate community server 475 for each of a number of different communities 455, 460, 465. In other embodiments, such community servers 475 may serve more than one community. Each community server 475 may distribute the rules data and plug-ins for their respective communities. An infrastructure server 480 may perform the network management functions for each of the trading partner in each community (or for a subset of the communities). The community servers 475 and infrastructure server 480 may, in combination, be the server computer system described with reference to FIG. 1 or 3.

In a first community (Community I 455), there are four trading partners 125-r, 125-s. In Community I 455, the community server 475-r may distribute rules or other data (visibility rules, document transformation rules, allowed document types, or plug-ins) for the exchange of procurement documents between the trading partners of Community I (as indicated by the dashed lines of connection). The exchange and visibility rules for Community I 455 dictate that the trading partners 125-r-1, 125-r-3, and 125-s may see and exchange procurement documents with only trading partner 125-r-2 (as indicated by the solid lines of connection).

In a second community (Community II 460), there are three trading partners 125-s, 125-t, and 125-u. In Community II 460, the community server 475-t may distribute rules or other data (visibility rules, document transformation rules, allowed document types, or plug-ins) for the exchange of procurement documents between the trading partners of Community II 460 (as indicated by the dashed lines of connection). The exchange and visibility rules for Community II 460 dictate that the trading partners 125-s, 125-t, 125-u may see and exchange procurement documents with each other, according to the rules of Community II 460 (as indicated by the solid lines of connection). Note that trading partner 125-s is member of both Community I 455 and Community II 460.

In a third community (Community III 465), there are four trading partners 125-u, 125-v. In Community III 465, the community server 475-v may distribute rules or other data (visibility rules, document transformation rules, allowed document types, or plug-ins) for the exchange of procurement documents between the trading partners of Community III 465 (as indicated by the dashed lines of connection). The exchange and visibility rules for Community III 465 dictate that the trading partners 125-u, 125-v may see and exchange procurement documents with each other, according to the rules of Community III 465 (as indicated by the solid lines of connection). Note that trading partner 125-u is member of both Community III 465 and Community II 460. [0053]

Figure 5:
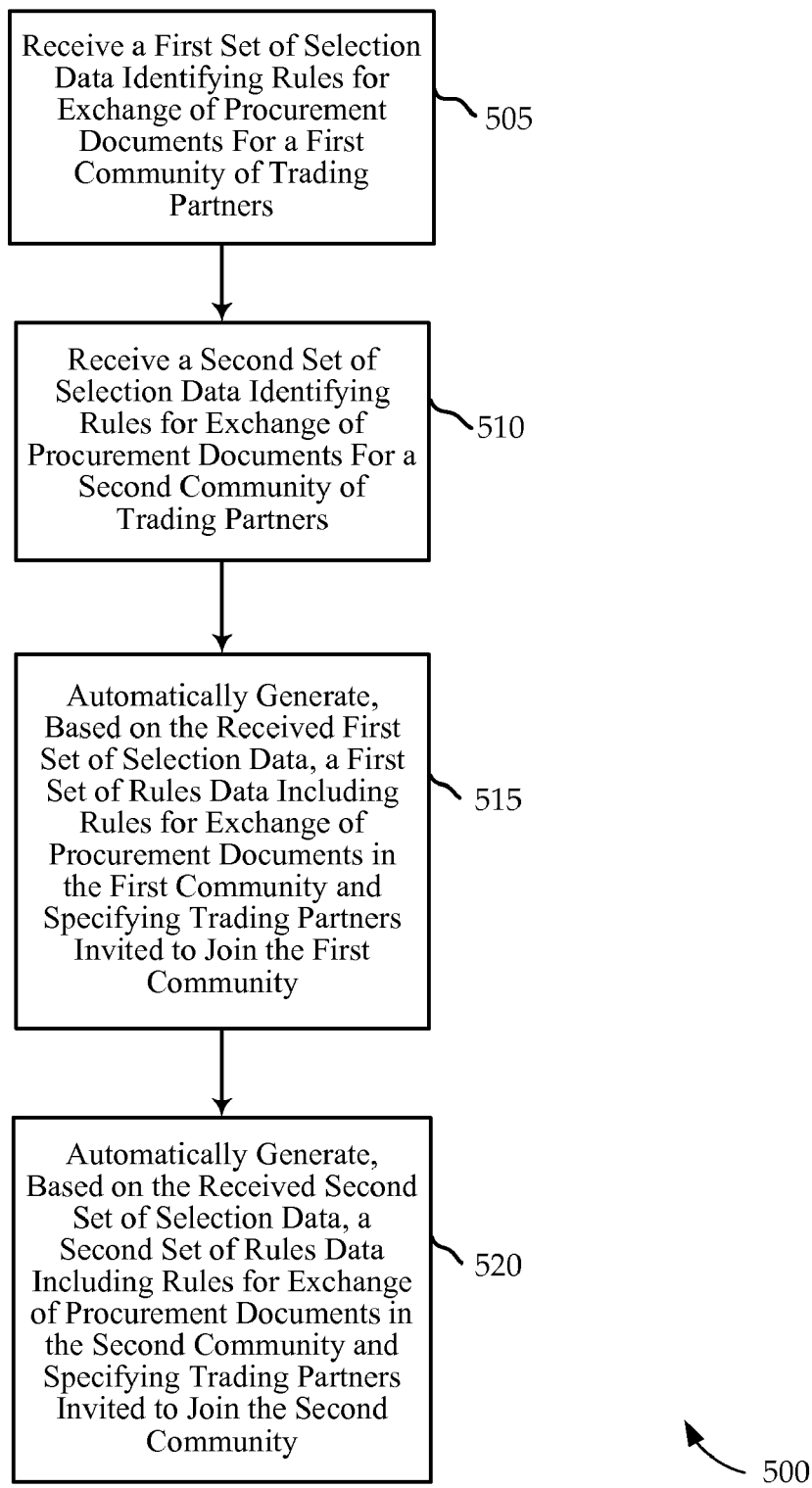
FIG. 5 is a flow chart illustrating a method for generating rules for respective communities of a community-based system for procurement document exchange according to various embodiments of the invention.

Referring next to FIG. 5, a flow chart is shown illustrating a method 500 for generating rules for respective communities of a community-based system of procurement document exchange according to various embodiments of the invention. This method 500 may, for example, be performed in whole or in part by the server computer system 105 of FIG. 1 or 3, the host trading partner 120 of FIG. 1 or 4, or any combination thereof.

At block 505, a first set of selection data is received, the selection data identifying rules for exchange of procurement documents for a first community of trading partners. At block 510, a second set of selection data is received, the selection data identifying rules for exchange of procurement documents for a second community of trading partners. At block 515, a first set of rules data is automatically generated based on the received first set of selection data, the first set of rules data including rules for exchange of procurement documents in the first community and specifying trading partners invited to join the first community. At block 520, a second set of rules data is automatically generated based on the received second set of selection data, second set of rules data including rules for exchange of procurement documents in the second community, and specifying trading partners invited to join the second community.

Figure 6:
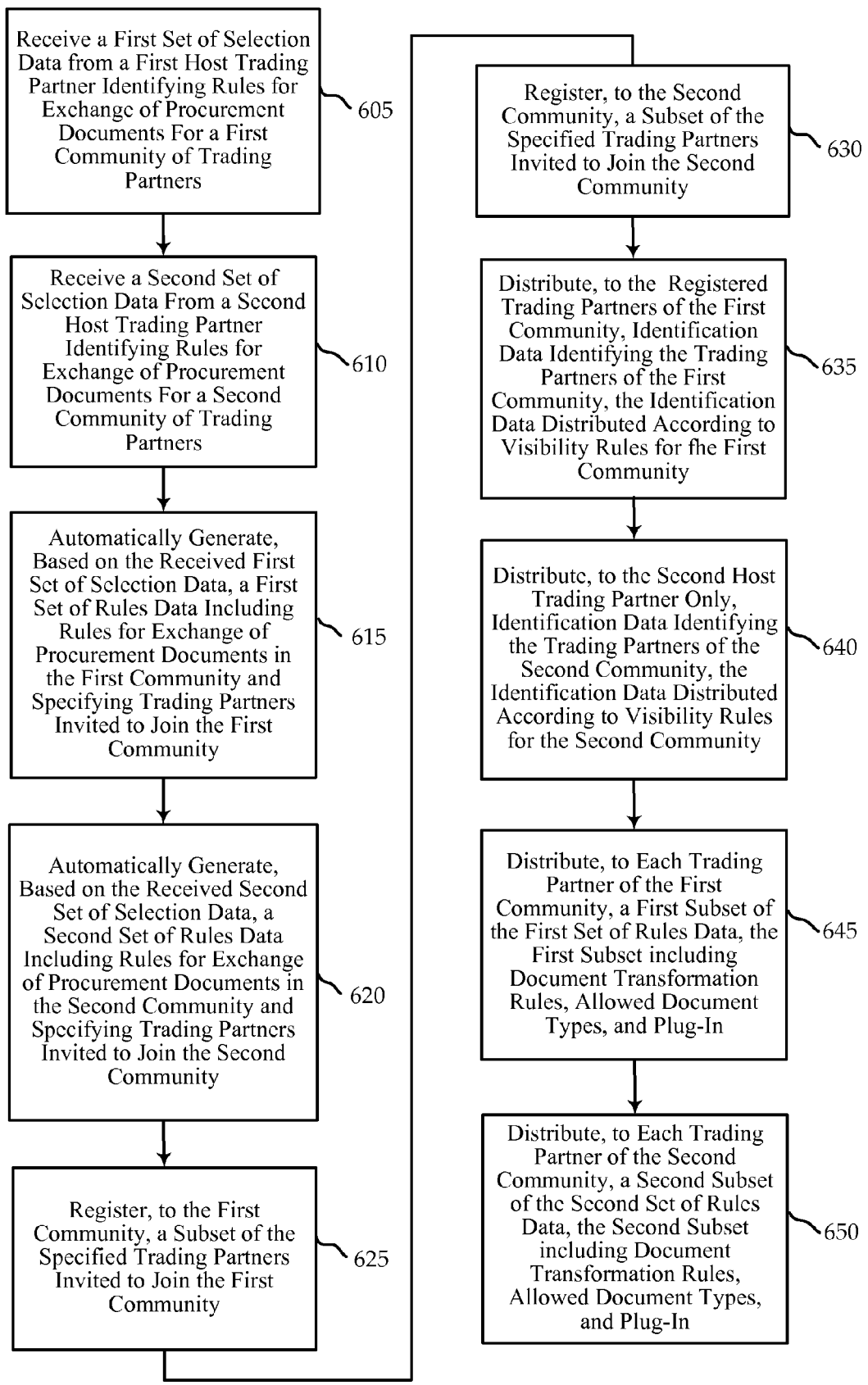
FIG. 6 is a flow chart illustrating a method for generating and distributing rules for respective communities of a community-based system for procurement document exchange according to various embodiments of the invention.

Referring next to FIG. 6, a flow chart is shown illustrating a method 600 for generating and distributing rules for respective communities of a community-based system for procurement document exchange according to various embodiments of the invention. This method 600 may, for example, be performed in whole or in part by the server computer system 105 of FIG. 1 or 3, the host trading partner 120 of FIG. 1 or 4, or any combination thereof.

At block 605, a first set of selection data is received from a first host trading partner, the selection data identifying rules for exchange of procurement documents for a first community of trading partners. At block 610, a second set of selection data is received from a second host trading partner, the selection data identifying rules for exchange of procurement documents for a second community of trading partners. At block 615, a first set of rules data is automatically generated based on the received first set of selection data, the first set of rules data including rules for exchange of procurement documents in the first community and specifying trading partners invited to join the first community. At block 620, a second set of rules data is automatically generated based on the received second set of selection data, second set of rules data including rules for exchange of procurement documents in the second community and specifying trading partners invited to join the second community.

At block 625, a subset of the specified trading partners invited to join the first community is registered to the first community. At block 630, a subset of the specified trading partners invited to join the second community is registered to the second community. At block 635, identification data identifying the trading partners of the first community is distributed to the registered trading partners of the first community, the identification data distributed according to visibility rules for the first community. At block 640, identification data identifying the trading partners of the second community is distributed to the second host trading partner only (and not the remainder of the trading partners of the community), the identification data distributed according to visibility rules for the second community. At block 645, a first subset of the first set of rules data is distributed to each trading partner of the first community, the first subset including document transformation rules, allowed document types, and a plug-in. The trading partners of the first community may then exchange procurement documents with each other (peer to peer) according to the first set of rules data. At block 650, a second subset of the second set of rules data is distributed to each trading partner of the second community, the second subset including document transformation rules, allowed document types, and a plug-in. The trading partners of the second community may then exchange procurement documents with the host trading partner according to the second set of rules data.

Figure 7:
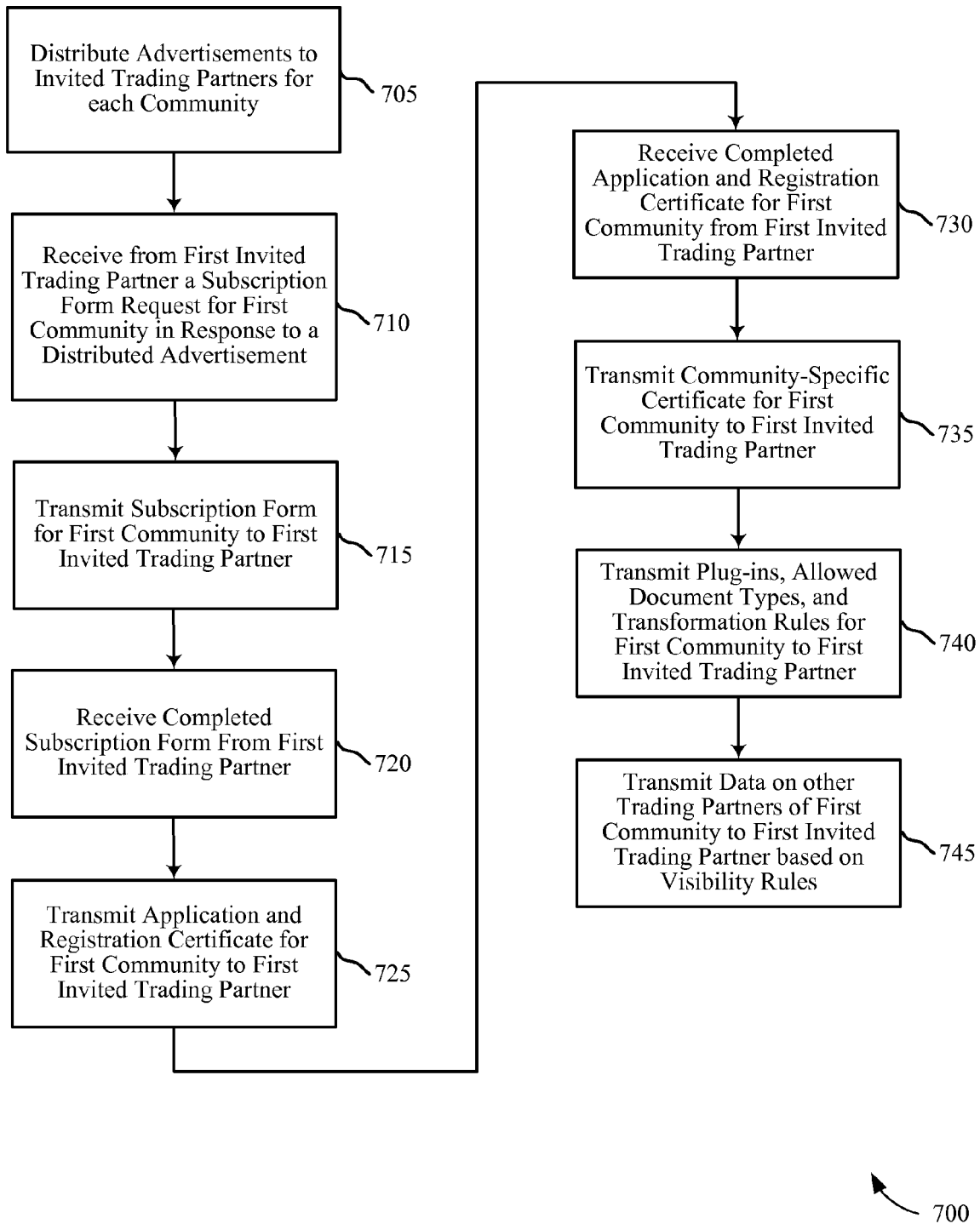
FIG. 7 is a flow chart illustrating a method for registering trading partners for respective communities of a community-based system procurement document exchange according to various embodiments of the invention.

Referring next to FIG. 7, a flow chart is shown illustrating a method 700 for registering trading partners for respective communities of a community-based system procurement document exchange according to various embodiments of the invention. This method 700 may, for example, be performed in whole or in part by the server computer system 105 of FIG. 1 or 3, the host trading partner 120 of FIG. 1 or 4, or any combination thereof.

At block 705, advertisements are distributed to invited trading partners for each community. At block 710, a subscription form request is received from the first invited trading partner for the first community in response to a distributed advertisement. At block 715, a subscription form for the first community is transmitted to the first invited trading partner. At block 720, a completed subscription form is received from the first invited trading partner.

At block 725, an application and registration certificate for the first community is transmitted to the first invited trading partner. At block 730, a completed application and registration certificate for the first community is received from the first invited trading partner. At block 735, a community-specific certificate for the first community is transmitted to the first invited trading partner. At block 740, plug-ins, allowed document types, and transformation rules for the first community are transmitted to the first invited trading partner. At block 745, data identifying other trading partners of the first community is transmitted to the first invited trading partner based on visibility rules.

Figure 8:
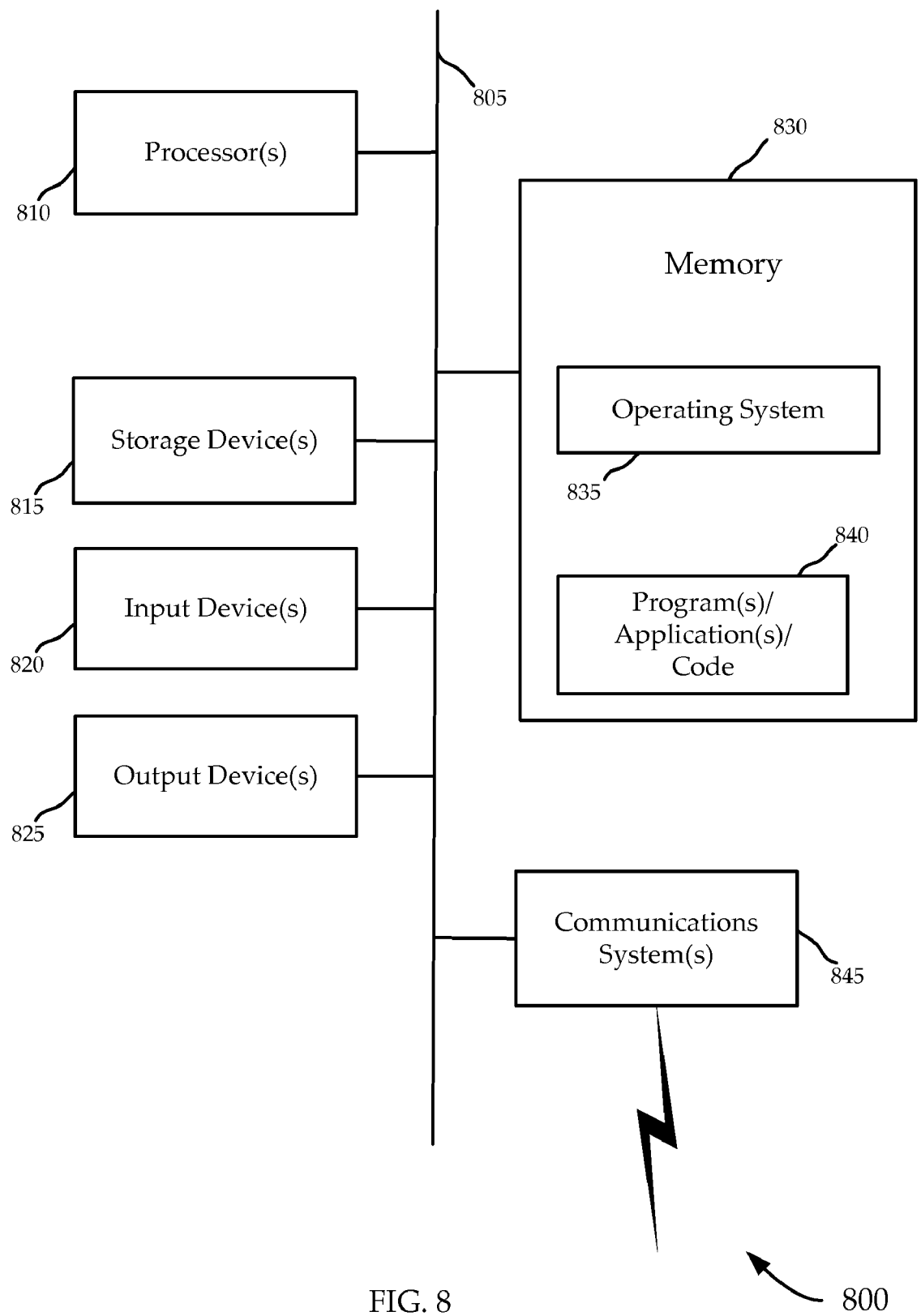
FIG. 8 is a schematic diagram that illustrates a representative device structure that may be used in various embodiments of the present invention.

A device structure 800 that may be used for a server computer system 105 of FIG. 1 or 3, the host trading partners 120 or the computing devices 125 of FIG. 1 or 4, or for other computing device described herein, is illustrated with the schematic diagram of FIG. 8. This drawing broadly illustrates how individual system elements of each of the aforementioned devices may be implemented, whether in a separated or more integrated manner. The example structure is shown made up of hardware elements that are electrically coupled via bus 805, including processor(s) 810 (which may further comprise a DSP or special-purpose processor), storage device(s) 815, input device(s) 820, and output device(s) 825. The storage device(s) 815 may be a machine-readable storage media reader connected to any machine-readable storage medium, the combination comprehensively representing remote, local, fixed, or removable storage devices or storage media for temporarily or more permanently containing computer-readable information. The communications systems interface 845 may interface to a wired, wireless, or other type of interfacing connection that permits data to be exchanged with other devices. The communications system(s) 845 may permit data to be exchanged with a network.

The structure 800 may also include additional software elements, shown as being currently located within working memory 830, including an operating system 835 and other code 840, such as programs or applications designed to implement methods of the invention. It will be apparent to those skilled in the art that substantial variations may be used in accordance with specific requirements. For example, customized hardware might also be used, or particular elements might be implemented in hardware, software (including portable software, such as applets), or both.

It should be noted that the methods, systems, and devices discussed above are intended merely to be examples. It must be stressed that various embodiments may omit, substitute, or add various procedures or components as appropriate. For instance, it should be appreciated that, in alternative embodiments, the methods may be performed in an order different from that described, and that various steps may be added, omitted, or combined. Also, features described with respect to certain embodiments may be combined in various other embodiments. Different aspects and elements of the embodiments may be combined in a similar manner. Also, it should be emphasized that technology evolves and, thus, many of the elements are examples and should not be interpreted to limit the scope of the invention.

Specific details are given in the description to provide a thorough understanding of the embodiments. However, it will be understood by one of ordinary skill in the art that the embodiments may be practiced without these specific details. For example, well-known circuits, processes, algorithms, structures, and techniques have been shown without unnecessary detail in order to avoid obscuring the embodiments.

Also, it is noted that the embodiments may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure.

Moreover, as disclosed herein, the term "memory," "memory unit," or "data store" may represent one or more devices for storing data, including read-only memory (ROM), random access memory (RAM), magnetic RAM, core memory, magnetic disk storage mediums, optical storage mediums, flash memory devices, or other computer-readable mediums for storing information. The term "computer-readable medium" includes, but is not limited to, portable or fixed storage devices, optical storage devices, a sim card, other smart cards, and various other storage mediums capable of storing, containing, or carrying instructions or data.

Furthermore, embodiments may be implemented by hardware, software, firmware, middleware, microcode, hardware description languages, or any combination thereof. When implemented in software, firmware, middleware, or microcode, the program code or code segments to perform the necessary tasks may be stored in a computer-readable medium such as a storage medium. Processors may perform the necessary tasks.

Having described several embodiments, it will be recognized by those of skill in the art that various modifications, alternative constructions, and equivalents may be used without departing from the spirit of the invention. For example, the above elements may merely be a component of a larger system, wherein other rules may take precedence over or otherwise modify the application of the invention. Also, a number of steps may be undertaken before, during, or after the above elements are considered. Accordingly, the above description should not be taken as limiting the scope of the invention.

What is claimed is:

1. A method for community-based exchange of procurement documents, the method comprising:
managing, with a server computer system, a first set of rules for a first community of trading partners, the first set of rules specifying rules for direct peer-to-peer exchange and transformation of procurement documents in the first community and specifying trading partners invited to join the first community;

transmitting the first set of rules to a first plurality of computing devices comprising the first community of trading partners;

managing, with the server computer system, a second set of rules, different from the first set, for a second community of trading partners, the second set of rules specifying rules for direct peer-to-peer exchange and transformation of procurement documents in the second community and specifying trading partners invited to join the second community; and transmitting the second set of rules to a second plurality of computing devices comprising the second community of trading partners, wherein only a subset of the first plurality of computing devices is in the second plurality of computing devices.

2. The method of claim 1, further comprising:
storing a listing of trading partners subscribed to the first community and a listing of trading partners subscribed to the second community.

3. The method of claim 1, wherein,
the first set of rules comprises a first subscription process for the first community; and
the second set of rules comprises a second subscription process for the second community.

4. The method of claim 1, wherein,
a host trading partner comprising one of the first plurality of computing devices selects at least some of the first set of rules via transmission of selection data to the server computer system.

5. The method of claim 4, further comprising
receiving selection data modifying the first set of rules, the modification comprising a change in rules for exchange of procurement documents in the first community and a change in trading partners invited to join the first community.

6. The method of claim 1, wherein,
the first community of trading partners is an open community, specifying all trading partners are invited to join the first community; and
the second community of trading partners is a closed community, specifying limited trading partners are invited to join the second community.

7. A system for community-based exchange of procurement documents, the system comprising:
a server computer system configured to:
manage a first set of rules for a first community of trading partners, the first set of rules specifying rules for direct peer-to-peer exchange and transformation of procurement documents within the first community and specifying trading partners invited to join the first community; and
manage a second set of rules, different from the first set, for a second community of trading partners, the second set of rules specifying rules for direct peer-to-peer exchange and transformation of procurement documents within the second community and specifying trading partners invited to join the second community; and
a first plurality of computing devices comprising the first community of trading partners, each in communication with the server computer system, and each configured to:
receive the first set of rules from the server computer system specifying the rules for direct peer-to-peer exchange and transformation of procurement documents within the first community; and
exchange and transform procurement documents directly within the first community according to the received first set of rules; and
a second plurality of computing devices comprising the second community of trading partners, each in communication with the server computer system, and each configured to:
receive the second set of rules from the server computer system specifying the rules for direct peer-to-peer exchange and transformation of procurement documents within the second community; and
exchange and transform procurement documents directly within the second community according to the received second set of rules,
wherein only a subset of the first plurality of computing devices is in the second plurality of computing devices.

8. The system of claim 7, wherein the server computer system is further configured to:
store a listing of trading partners subscribed to the first community and a listing of trading partners subscribed to the second community.

9. The system of claim 7, wherein,
the first set of rules comprises a first subscription process for the first community; and
the second set of rules comprises a second subscription process for the second community.

10. The system of claim 7, wherein,
a host trading partner comprising one of first plurality of computing devices selects at least some of the first set of rules via transmission of selection data to the server computer system.

11. The system of claim 10, wherein,
the host trading partner is configured to modify the first set of rules via transmission of selection data to the server computer system, the modification comprising a change in rules for exchange of procurement documents in the first community and a change in trading partners invited to join the first community.

12. The system of claim 7, wherein,
the first community of trading partners is an open community, specifying all trading partners are invited to join the first community; and
the second community of trading partners is a closed community, specifying limited trading partners are invited to join the second community.

13. The system of claim 7, wherein,
the first set of rules comprises a first set of visibility rules for the first community; and
the second set of rules comprises a second set of visibility rules for the second community.

14. The system of claim 13, wherein,
the first set of visibility rules specifies that the trading partners of the first community will be visible to each other via their respective computing devices; and
the second set of visibility rules specifies that the trading partners of the second community will be visible to a host trading partner but not visible to each other via their respective computing devices.

15. The system of claim 7, wherein,
the first set of rules comprises a first set of document transformation rules for use in the first community, the first set of document transformation rules identifying a first set of one or more standardized document formats for direct exchange of procurement documents between trading partners of the first community; and the second set of rules comprises a second set of document transformation rules for use in the second community, the second set of document transformation rules identifying a second set of one or more standardized document formats for direct exchange of procurement documents between trading partners of the second community.

16. The system of claim 7, wherein,
the first set of rules comprises a first set of allowed document types for use in the first community; and
the second set of rules comprises a second set of allowed document types for use in the second community.

17. The system of claim 16, wherein,
the server computer system is configured to distribute a set of plug-in data to each of the trading partners of the first community, the plug-in data formatted to be installed on each of the first plurality of computing devices to transform one or more of the first set of allowed document types into a standardized document format for transmission.

18. The system of claim 7, wherein,
the server computer system is configured to distribute a set of plug-in data to each of the trading partners of the first community, the plug-in data formatted to be installed on each of the first plurality of computing devices to generate a user interface for use in the first community.

19. The system of claim 7, wherein,
the first set of rules comprises a first set of validation rules to securely validate an exchange of procurement documents in the first community; and
the second set of rules comprises a second set of validation to securely validate an exchange of procurement documents in the second community.

20. The system of claim 7, wherein the procurement documents comprise at least one of a request for information, a request for price, a request for quotation, a quote, a purchase order, a sales order, a change order, an order cancellation, an order confirmation response, an order response, an order status request, an order status response, an advance shipment notification, a dispatch advice, a goods receipt, a receipt advice, a planning schedule, a shipping schedule, a supply schedule, a supply schedule response, a delivery planning, a delivery planning response, a delivery planning proposal, an invoice, an invoice response, a freight invoice, a self billed credit note, a self billed invoice, a credit note, a debit note, a remittance advice, a payment request, a payment status request, a payment status response, an inventory report, a consumption forecast, a consumption report, a bill of lading, a transportation status, a waybill, forwarding instructions, a catalog, a catalog deletion, a catalog item specification update, a catalog pricing update, or a catalog request.

21. A system for community-based exchange of procurement documents, the system comprising:
means for managing, with a server computer system, a first set of rules for a first community of trading partners, the first set of rules specifying rules for direct peer-to-peer exchange and transformation of procurement documents in the first community and specifying trading partners invited to join the first community;
means for transmitting the first set of rules to a first plurality of computing devices comprising the first community of trading partners;
means for managing, with the server computer system, a second set of rules, different from the first set, for a second community of trading partners, the second set of rules specifying rules for direct peer-to-peer exchange and transformation of procurement documents in the second community and specifying trading partners invited to join the second community; and
means for transmitting the second set of rules to a second plurality of computing devices comprising the second community of trading partners, wherein only a subset of the first plurality of computing devices is in the second plurality of computing devices.

* * * * *